United States Patent
Saka et al.

(10) Patent No.: US 11,230,659 B2
(45) Date of Patent: Jan. 25, 2022

(54) FILLING MATERIAL FOR UNDERGROUND TREATMENT, UNDERGROUND TREATMENT METHOD AND FILLING WELL WALL METHOD

(71) Applicant: Mitsubishi Chemical Corporation, Tokyo (JP)

(72) Inventors: Takahiro Saka, Tokyo (JP); Masaya Nakai, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/910,172

(22) Filed: Jun. 24, 2020

(65) Prior Publication Data

US 2020/0325383 A1 Oct. 15, 2020

Related U.S. Application Data

(63) Continuation of application No. PCT/JP2018/048338, filed on Dec. 27, 2018.

(51) Int. Cl.
*C09K 8/508* (2006.01)
*E21B 33/138* (2006.01)

(52) U.S. Cl.
CPC .......... *C09K 8/5083* (2013.01); *E21B 33/138* (2013.01)

(58) Field of Classification Search
CPC ...... E21B 43/26; E21B 33/138; E21B 43/261; E21B 43/267; C09K 2208/12; C09K 8/24; C09K 8/5083; C09K 8/512; C09K 8/508; C09K 8/68; C09K 8/725; C09K 8/88
See application file for complete search history.

(56) References Cited

U.S. PATENT DOCUMENTS

| | | |
|---|---|---|
| 4,551,256 A | 11/1985 | Kita et al. |
| 2011/0160096 A1 | 6/2011 | Roddy |
| 2014/0360728 A1 | 12/2014 | Tashiro et al. |
| 2016/0177693 A1 | 6/2016 | Gomaa et al. |
| 2016/0237183 A1 | 8/2016 | Yamauchi et al. |
| 2018/0362404 A1 | 12/2018 | Saka et al. |

FOREIGN PATENT DOCUMENTS

| | | |
|---|---|---|
| JP | 57-205475 A | 12/1982 |
| JP | 2002-161268 | 6/2002 |
| JP | 2004-099677 | 4/2004 |
| WO | 2017/099082 | 6/2017 |

OTHER PUBLICATIONS

EESR issued in EP Patent Application No. 18896559.4, dated Feb. 8, 2021.
ISR issued in WIPO Patent Application No. PCT/JP2018/048338, dated Mar. 5, 2019, English translation.
Written Opinion issued in WIPO Patent Application No. PCT/JP2018/048338, dated Mar. 5, 2019, English translation.
IPRP issued in WIPO Patent Application No. PCT/JP2018/048338, dated Jun. 30, 2020, English translation.

*Primary Examiner* — Zakiya W Bates

(74) *Attorney, Agent, or Firm* — Greenblum & Bernstein, P.L.C.

(57) ABSTRACT

A filling material for underground treatment of the present invention contains at least one polyvinyl alcohol-based resin of a modified polyvinyl alcohol-based resin and an unmodified polyvinyl alcohol, and a swelling ratio of the polyvinyl alcohol-based resin after immersion in water at a temperature of 80° C. for 30 minutes is 250% to 900%. The filling material for underground treatment has enhanced swelling performance, is effective in preventing phenomena such as lost circulation, and has improved workability of filling a well drilled part with the filling material.

8 Claims, No Drawings

FILLING MATERIAL FOR UNDERGROUND TREATMENT, UNDERGROUND TREATMENT METHOD AND FILLING WELL WALL METHOD

CLAIM FOR PRIORITY

This application is a Continuation of PCT/JP2018/048338 filed Dec. 27, 2018, and claims the priority benefit of Japanese application 2017-254845 filed Dec. 28, 2017, the contents of which are expressly incorporated by reference herein in their entireties.

TECHNICAL FIELD

The present invention relates to a filling material for underground treatment and a method for filling a well wall, and particularly to a filling material for underground treatment used during construction of a muddy water drilling method, and a method for filing a well wall using the filling material for underground treatment.

BACKGROUND ART

Hydrocarbon resources (hereinafter, collectively referred to as "petroleum or the like") such as petroleum (including shale oil and the like) or natural gas (including shale gas and the like) have been mined and produced through wells (oil well or gas well, hereinafter, collectively referred to as "well") having porous and permeable underground layers.

The laying of the well (hereinafter, also referred to as "well drilling") is performed, for example, by the following process. That is, after steps including a drilling step of, using a drill, drilling a well bore in a direction vertical to the ground surface and, if necessary, further in a horizontal direction, a casing step of preventing collapse of the well bore and preventing fluid leakage through an inner wall of the well bore (well wall), a cementing step of finishing the well wall, a perforation step of perforating the well wall to recover petroleum or the like in a production layer (a layer producing petroleum or the like, for example, a shale layer producing shale gas, etc.), and completing steps including a fracturing step of injecting a high-pressure fluid into the perforation to form and expand a fracture in the well wall, the laying of the well is completed. Rehabilitation of the well that has already been laid is implemented through almost the same process as laying new a well.

In the well laying process, various fluids are used, and various types of water-based fluids, oil-based fluids, and emulsions are used.

In the drilling step, muddy water (also referred to as "drilling fluid") is circulated to remove drilling wastes from the bottom (tip) of the well bore and around the drill to raise the drilling wastes to the ground, or to cool the drill and its surroundings to provide lubrication, or to prevent eruptions by reducing underground pressure. At this time, when the muddy water escapes through the well wall during drilling or through fractures in the well wall, the well wall and the well bore collapse and unexpected formation fluid intrusion occurs, which is dangerous. Therefore, in order to prevent the muddy water from escaping from the well wall, the muddy water is mixed with a lost circulation material (LCM) for filling the well wall.

As the lost circulation material (LCM), various inorganic substances and organic substances are used, for example, fibrous materials such as cedar skin, sugarcane fiber, and mineral fiber, granules such as limestone, marble, wood, walnut shells, cotton nut shells, corn cobs, and synthetic resins, and flakes such as mica flakes, resin film flakes, small cellophane flakes.

For example, there has been proposed a lost circulation material which is to be charged into drill holes and trenches during construction of the muddy water drilling method, the lost circulation material is formed by molding a mixture of (A) an inorganic fine powder and (B) a water-absorbent resin into a desired shape (see Patent Literature 1), and a lost circulation material which is made by mixing a highly water-absorbent synthetic resin material with a fibrous material such as pulp cotton, cotton, waste paper, waste pulp, asbestos and cotton waste (see Patent Literature 2).

In the perforation step or the fracturing step, a closed space is sequentially formed in the well bores using a pro-arranged filling member such as a frac plug or a frac sleeve, the well wall is perforated by a high-pressure fluid injected into the closed space, and further fractures are formed (perforations may be made using gunpowder). Therefore, when the high-pressure fluid escapes from the well wall, a desired fluid pressure is not obtained, resulting in the inability to form the desired perforation or fracture. Thus, it is necessary to temporarily fill the well wall. Resin particles or the like may be used as the filling material. Further, a fracturing method of sequentially repeating fracturing and temporary filling without using a filling member such as a plug is also adopted. In addition, a method in which a fracture that has been opened is temporarily filled to collect petroleum or the like again by fracturing a different place is also adopted.

It is also necessary to temporarily fill the fractures formed in the production layer before a flow back in which a fracturing fluid is refluxed to the ground, thereby preventing outflow of petroleum or the like and improving productivity. In order to start production of petroleum or the like, in the case of injecting the high-pressure fluid to remove obstacles or the like remaining in the well, when the high-pressure fluid escapes from the well wall, the desired fluid pressure cannot be obtained, and the obstacles cannot be removed. Loss of the function of filling the well wall before installation of equipment is completed can result in unexpected formation fluid intrusion. The filling material is sometimes called a bridge material, and calcium carbonate or the like is often used.

Therefore, well treatment fluids such as the muddy water (drilling fluid), the cementing fluid, the perforation fluid, the fracturing fluid or the completing fluid used in the above steps are compounded with various compounding agents and a temporary plug for temporarily filling the well wall, such as a lost circulation material (LCM) and a diverting agent. Further, prior to the flow of these well treatment fluids into the well bore, a temporary filling fluid containing a temporary plug is flowed into the well bore.

It is desirable that these temporary plugs be removed from the well wall when starting production of petroleum or the like so as not to hinder leaching of petroleum or the like. For this purpose, a liquid containing a material having a dissolving effect on the temporary plug such as an acidic substance or an alkaline substance may be injected into the well bore.

In the well treatment fluids such as the muddy water (drilling fluid), the cementing fluid, the perforation fluid, the fracturing fluid or the completing fluid, when a degradable material that decomposes after a predetermined period of time is used as a compounding agent to be added for various purposes, eliminating the need for recovery or disposal has led to reductions in well drilling costs and process shortening.

CITATION LIST

Patent Literature

Patent Literature 1: JP-A-2002-161268
Patent Literature 2: JP-A-2004-99677

SUMMARY OF INVENTION

Technical Problem

However, a conventional filling material for underground treatment is likely to have low specific gravity and may float in the muddy water for drilling, so that during the filling, the muddy water must be continuously stirred, and there is a problem that the workability of filling the drilled part is poor. In addition, when a polymer material having a high water absorption property is used, the swelling property is too high, and the viscosity of the muddy water for drilling is too high, and similarly, there is a problem that the filling workability is deteriorated. In the muddy water drilling method, during the drilling, the muddy water for drilling continues to be supplied, and therefore, when the filling workability of the muddy water for drilling deteriorates, the capacity of producing crude oil and gas is reduced.

Therefore, in order to solve the above problems, the present invention provides a filling material for underground treatment, which has excellent swelling performance, is effective in preventing phenomena such as lost circulation, and has improved workability of filling a well drilled part with the filling material.

Solution to Problem

As a result of intensive studies, the present inventors have found that the above problems can be solved by using a polyvinyl alcohol-based resin exhibiting a specific swelling ratio when measured under specific swelling conditions. Thus, the present invention has been completed.

That is, the present invention is characterized in the following (1) to (7).

(1) A filling material for underground treatment containing at least one polyvinyl alcohol-based resin of a modified polyvinyl alcohol-based resin and an unmodified polyvinyl alcohol, wherein a swelling ratio of the polyvinyl alcohol-based resin after immersion in water at a temperature of 80° C. for 30 minutes is 250% to 900%.

(2) The filling material for underground treatment according to the above (1), wherein the modified polyvinyl alcohol-based resin is a polyvinyl alcohol-based resin (A) containing a carboxyl group.

(3) The filling material for underground treatment according to the above (1), wherein the modified polyvinyl alcohol-based resin is a crosslinked product (A1) of a polyvinyl alcohol-based resin (A) containing a carboxyl group by heat treatment.

(4) The filling material for underground treatment according to the above (1), wherein the modified polyvinyl alcohol-based resin is a crosslinked product (A2) of a polyvinyl alcohol-based resin (A) containing a carboxyl group with crosslinker.

(5) The filling material for underground treatment according to any one of the above (1) to (4), which is for drilling.

(6) An underground treatment method including: incorporating the filling material for underground treatment according to any one of the above (1) to (5) into a liquid to be flown into a well formed underground.

(7) A method for filling a well wall, including: incorporating the filling material for underground treatment according to any one of the above (1) to (5) into muddy water near the ground where lost circulation is likely to occur.

Advantageous Effects of Invention

According to the filling material for underground treatment of the present invention, the water absorption property is high, so that the polyvinyl alcohol-based resin swollen by water absorption can effectively close gaps such as fractures formed in wells such as drilling holes and trenches, and the dispersibility in muddy water is excellent, so that the workability of filling the drilled part is improved. Therefore, the filling material for underground treatment of the present invention is effective for preventing a lost circulation phenomenon and plugging.

DESCRIPTION OF EMBODIMENTS

Hereinafter, a filling material for underground treatment of the present invention will be described in more detail.

The term "polyvinyl alcohol" is sometimes simply referred to as "PVA".

Further, in the present description, "mass" has the same meaning as "weight".

In the present description, "underground treatment" refers to a treatment to improve a wall condition of wells (holes) formed underground, and "filling material for underground treatment" is a material for temporarily closing a gap such as a fracture formed in a wall surface of an underground well.

The filling material for underground treatment of the present invention contains at least one polyvinyl alcohol-based resin (hereinafter, simply referred to as PVA-based resin) of a modified polyvinyl alcohol-based resin and an unmodified polyvinyl alcohol, and a swelling ratio (height swelling ratio) of the PVA-based resin after immersion in water at a temperature of 80° C. for 30 minutes is 250% to 900%. The temperature at the underground filling appearance site is higher than the temperature above the ground, and it is assumed to be about 40° C. to 120° C., depending on the type, the region and the depth of the well. Therefore, in the present invention, the swelling ratio at a middle temperature of 80° C. is adopted. If the PVA-based resin has a swelling ratio of 250% to 900% after immersion in water at a temperature of 80° C. for 30 minutes, swelling particles are densely filled in a filling target. Therefore, for example, when the filling material is contained in muddy water in a muddy water drilling method, the PVA-based resin can be swelled at a place where a lost circulation phenomenon occurs, and accordingly the lost circulation can be prevented. In addition, since the PVA-based resin is also excellent in dispersibility in water, the filling property to a drilled part is improved.

The swelling ratio is preferably 350% to 900%, more preferably 400% to 900%, still more preferably 600% to 900%, particularly preferably 700% to 900%, and most preferably 750% to 850%.

The swelling ratio can be specifically measured as follows.

1. A PVA-based resin in an amount of 0.5 g is weighed and placed in a 10 mL test tube having an inner diameter of 13.5 mm, and the height of the PVA-based resin in the test tube at this time is measured as an initial height.

2. Into the test tube, 7 mL of water is charged, followed by stirring, and the PVA-based resin is dispersed in the water.

3. The test tube is immersed in a water bath whose temperature has been controlled to 80° C., and is left for 30 minutes after the water temperature in the test tube reaches 80° C.

4. The height of the PVA-based resin in the test tube after 30 minutes is measured as the height after swelling.

5. The swelling ratio (height swelling ratio) of the PVA-based resin is calculated according to the following equation.

$$\text{Swelling ratio (\%)} = (\text{height after swelling}/\text{initial height}) \times 100$$

In the present invention, in order to enhance the workability of filling the filling material for underground treatment into the drilled part and effectively perform the filling, it is desirable that the PVA-based resin does not rapidly swell. The PVA-based resin having a swelling ratio of 250% to 900% after immersion in water at a temperature of 80° C. for 30 minutes has molecules entangled with each other mainly through intermolecular bonds due to hydrogen bonds and crosslinks of hydroxy groups. Therefore, it takes time and temperature to loosen the entanglement in order to swell, so the PVA-based resin does not swell in the early stage of immersion. However, when the entanglement is loosened and the PVA-based resin combines sufficiently with water, a sufficient swelling property is exhibited, and the effects of the present invention can be obtained.

Examples of a method of adjusting the swelling ratio of the PVA-based resin after immersion in water at a temperature of 80° C. for 30 minutes include a method of adjusting a particle diameter of resin powders, a method of performing a crosslinking treatment, and a method of introducing a functional group.

In order to increase the height swelling ratio, there are means such as reducing the particle diameter of the resin powder, decreasing a crosslinking density, and introducing an ionic functional group.

Conversely, in order to lower the height swelling ratio, there are means such as increasing the particle diameter of the resin powder, increasing the crosslinking density, and introducing a hydrophobic functional group.

A water separation ratio of the PVA-based resin is preferably 40% or less. In the present description, the water separation ratio refers to a ratio of water collected without being retained by the PVA-based resin when 3 parts by mass of the PVA-based resin is added to 400 parts by mass of water, and can be measured as follows.

1. Into a sample cell of a muddy water filtration tester, 400 parts by mass of purified water is charged, and 3 parts by mass of a PVA-based resin is added while stirring at 500 rpm.

2. After continuing the stirring for 30 minutes, the stirring is stopped and the mixture is allowed to stand for 5 minutes.

3. The inside of the cell is pressurized to 0.05 MPa, and a dehydrated liquid is collected.

4. The measurement is performed for 5 minutes, and the water separation ratio is calculated according to the following equation.

$$\text{Water separation ratio (\%)} = \text{recovered liquid (g)}/(\text{purified water (g)} + \text{resin (g)}) \times 100$$

The water separation ratio is preferably 1% to 25%, more preferably 1% to 20%, and particularly preferably 2% to 20%.

A content of the PVA-based resin in the filling material for underground treatment of the present invention is preferably 0.01 mass % or more, more preferably 0.1 mass % or more, and still more preferably 0.5 mass % or more. An upper limit is not particularly limited, and may be 100 mass % or less.

The PVA-based resin contained in the filling material for underground treatment of the present invention may be unmodified or modified. The PVA-based resin may be used alone or in combination of two or more thereof.

(Unmodified Polyvinyl Alcohol (PVA))

The unmodified PVA is obtained by saponifying a polymer obtained by polymerizing vinyl ester monomers such as vinyl acetate. In the present invention, a degree of saponification of the unmodified PVA is preferably 75 mol % to 100 mol %, more preferably 80 mol % to 99.8 mol %, and still more preferably 85 mol % to 99.5 mol %. When the degree of saponification is too low, the water absorption property may decrease.

The degree of saponification can be measured in accordance with JIS K 6726:1994, and is a content rate of structural units other than vinyl ester structural units in the PVA-based resin, and the same applies to the modified PVA-based resin described below.

An average polymerization degree of the unmodified PVA is preferably 300 to 4,000, more preferably 1,000 to 3,500, and still more preferably 1,500 to 3,000. When the average polymerization degree is too low, the water resistance tends to decrease, and when the average polymerization degree is too high, the viscosity increases, and handling and production tend to be difficult.

The average polymerization degree can be measured in accordance with JIS K 6726:1994, and the same applies to the modified PVA-based resin described below.

The viscosity of a 4 mass % aqueous solution of the unmodified PVA is preferably 2 mPa·s to 80 mPa·s, more preferably 4 mPa·s to 70 mPa·s, and still more preferably 10 mPa·s to 60 mPa·s. When the viscosity is too low, the water resistance tends to decrease, and when the viscosity is too high, the viscosity increases, and handling and production tend to be difficult.

The viscosity of the 4 mass % aqueous solution of the unmodified PVA is a viscosity at 20° C. measured in accordance with JIS K 6726:1994, by preparing a 4 mass % aqueous solution of the unmodified PVA, and the same applies to the modified PVA-based resin described below.

The shape of the unmodified PVA is not particularly limited, and is preferably powders. An average particle diameter of the powders is preferably 10 μm to 2000 μm, more preferably 50 μm to 1000 μm, and still more preferably 100 μm to 500 μm.

The average particle diameter is measured as a volume median diameter using a laser diffraction apparatus, and the same applies to the modified PVA-based resin described later.

(Modified Polyvinyl Alcohol (PVA)-based Resin)

The modified PVA-based resin is obtained by introducing any functional group into the unmodified PVA. Examples of the functional group to be introduced include various functional groups including: anionic groups such as a carboxyl group, a sulfonic acid group and a phosphoric acid group; cationic groups such as quaternary ammonium groups; active methylene group-containing modifying groups (an acetoacetyl group, a diacetone group, a diacetone acrylamide group, or the like); a carbonyl group; an amino group; a silanol group; an oxyalkylene group, and a mercapto group. Further, a PVA-based resin having a 1,2-diol structural unit in a side chain can also be used. Among these, from the viewpoint of the crosslinking property, a modified PVA-based resin containing a carboxyl group and an active methylene group-containing modifying group is preferred.

[Polyvinyl Alcohol-based Resin (A) Containing Carboxyl Group]

The polyvinyl alcohol-based resin (A) containing a carboxyl group (hereinafter, abbreviated as a carboxyl group-containing PVA-based resin (A)) is a resin obtained by copolymerizing a compound (monomer) containing a carboxyl group and a vinyl ester compound (monomer) and saponifying the copolymer, and contains a carboxyl group in the structure thereof.

A content (modification rate) of a structural unit containing a carboxyl group is preferably 0.1 mol % to 10 mol %, more preferably 0.3 mol % to 8 mol %, and still more preferably 0.5 mol % to 6 mol % of the entire structural unit. When the modification rate is too small, the water resistance tends to decrease, and when the modification rate is too large, the water absorption property tends to decrease.

A degree of saponification of the carboxyl group-containing PVA-based resin (A) is preferably 75 mol % to 100 mol %, more preferably 80 mol % to 99.8 mol %, and still more preferably 85 mol % to 99.5 mol %. When the degree of saponification is too low, the water absorption property tends to decrease.

The degree of saponification can be measured in accordance with JIS K 6726:1994.

An average polymerization degree of the carboxyl group-containing PVA-based resin (A) is preferably 300 to 4,000, more preferably 1,000 to 3,500, and still more preferably 1,500 to 3,000. When the average polymerization degree is too low, the water resistance tends to decrease, and when the average polymerization degree is too high, the viscosity increases, and handling and production tend to be difficult.

The average polymerization degree can be measured in accordance with JIS K 6726:1994.

The viscosity of a 4 mass % aqueous solution of the carboxyl group-containing PVA-based resin (A) is preferably 2 mPa·s to 80 mPa·s, more preferably 4 mPa·s to 70 mPa·s, and still more preferably 10 mPa·s to 60 mPa·s. When the viscosity is too low, the water resistance tends to decrease, and when the viscosity is too high, the viscosity increases, and handling and production tend to be difficult.

The viscosity of the 4 mass % aqueous solution of the carboxyl group-containing PVA-based resin (A) is a viscosity at 20° C. measured in accordance with JIS K 6726:1994, by preparing a 4 mass % aqueous solution of the carboxyl group-containing PVA-based resin (A).

The shape of the carboxyl group-containing PVA-based resin (A) is not particularly limited, and is preferably powders. An average particle diameter of the powder is preferably 10 μm to 2000 μm, more preferably 50 μm to 1000 μm, and still more preferably 100 μm to 500 μm. When the average particle diameter is too large, the dispersibility tends to decrease, and when the average particle diameter is too large, the water resistance tends to decrease.

The average particle diameter can be measured as a volume median diameter using a laser diffraction apparatus.

Examples of a method for producing the carboxyl group-containing PVA-based resin (A) include (1) a method of obtaining a copolymer from an unsaturated monomer containing a carboxyl group and a vinyl ester monomer and then saponifying the copolymer, and (2) a method of polymerizing a vinyl ester compound in the presence of an alcohol containing carboxyl group or a compound containing a carboxyl group and a functional group such as aldehyde or thiol as a chain transfer agent and then saponifying the polymer with a catalyst such as an alkali metal hydroxide. Among these, the method of (1) is practical in view of resin production and performance.

In the present invention, among the carboxyl group-containing PVA-based resin, a maleic acid-modified PVA-based resin and an itaconic acid-modified PVA-based resin are preferred in view of being easily polymerizable with a vinyl ester monomer, and a maleic acid-modified PVA-based resin is more preferred in view of handleability.

Hereinafter, the method of (1) will be specifically described.

Examples of the above unsaturated monomer containing a carboxyl group include monomers including ethylenically unsaturated dicarboxylic acids (such as maleic acid, fumaric acid, and itaconic acid), or ethylenically unsaturated carboxylic acid monoesters (such as maleic acid monoalkyl ester, fumaric acid monoalkyl ester, and itaconic acid monoalkyl ester), or ethylenically unsaturated dicarboxylic acid diesters (such as maleic acid dialkyl ester, fumaric acid dialkyl ester, and itaconic acid dialkyl ester), or ethylenically unsaturated carboxylic anhydrides (such as maleic anhydride and itaconic anhydride), or (meth)acrylic acid, or salts of the above. Ethylenically unsaturated carboxylic acid monoesters or salts thereof are suitably used.

Among these, in view of reactivity with the vinyl ester monomer, preferred are ethylenically unsaturated carboxylic acid monoesters, more preferred are maleic acid monoalkyl ester and itaconic acid monoalkyl ester, and particularly preferred is maleic acid monoalkyl ester.

As the vinyl ester monomer, vinyl formate, vinyl acetate, vinyl propionate, vinyl butyrate, vinyl caprate, vinyl laurate, vinyl versatate, vinyl palmitate, vinyl stearate and the like can be used alone or in combination. Vinyl acetate is particularly preferred in view of practicality.

In the present invention, when polymerizing the unsaturated monomer containing a carboxyl group and the vinyl ester compound, a saponified product of copolymer of a vinyl ester monomer and a copolymerizable monomer can also be used, in addition to the above unsaturated monomer containing a carboxyl group and the vinyl ester compound. Examples of the copolymerizable monomer include: olefins such as ethylene, propylene, isobutylene, α-octene, α-dodecene, and α-octadecene; hydroxy group-containing α-olefins such as 3-buten-1-ol, 4-penten-1-ol, 5-hexen-1-ol, and 3,4-dihydroxy-1-butene, and derivatives such as an acylated product thereof; unsaturated acids such as an acrylic acid, a methacrylic acid, a crotonic acid, a maleic acid, a maleic anhydride, an itaconic acid, an undecylenic acid, and a salt, a monoester or a dialkyl ester thereof; nitriles such as acrylonitrile and methacrylonitrile; amides such as diacetone acrylamide, acrylamide and methacrylamide; olefin sulfonic acids such as an ethylene sulfonic acid, an allyl sulfonic acid, a methallyl sulfonic acid or a salt thereof; alkyl vinyl ethers; vinyl compounds such as dimethylallyl vinyl ketone, N-vinylpyrrolidone, vinyl chloride, vinylethylene carbonate, 2,2-dialkyl-4-vinyl-1,3-dioxolan, and glycerin monoallyl ether, substituted vinyl acetates such as isopropenyl acetate and 1-methoxyvinyl acetate; vinylidene chloride; 1,4-diacetoxy-2-butene; 1,4-dihydroxy-2-butene; and vinylene carbonate.

Further examples include: polyoxyalkylene group-containing monomers such as polyoxyethylene (meth)allyl ether, polyoxyethylene (meth)acrylamide, polyoxypropylene (meth)acrylamide, polyoxyethylene (meth)acrylate, polyoxypropylene (meth)acrylate, polyoxyethylene (1-(meth)acrylamide-1,1-dimethylpropyl) ester, polyoxyethylene vinyl ether, polyoxypropylene vinyl ether, polyoxyethylene allylamine, polyoxypropylene allylamine, polyoxyethylene vinylamine, and polyoxypropylene vinylamine; and cationic group-containing monomers such as N-acrylamidomethyltrimethylammonium chloride, N-acrylamidoethyltrimethylammonium chloride, N-acrylamidopropyltrimethylammonium chloride, 2-acryloxyethyltrimethylammonium chloride, 2-methacryloxyethyltrimethylammonium chloride, 2-hydroxy-3-methacryloyloxypropyltrimethylammonium chloride, allyltrimethylammonium chloride, methallyltrimethylammonium chloride, 3-butenetrimethylammonium chloride, dimethyldiallylammonium chloride, and diethyldiallylammonium chloride.

(Meth)acryl means acryl or methacryl, and (meth)acrylate means acrylate or methacrylate, respectively.

An amount of the copolymerizable monomer to be introduced varies depending on the type of the monomer, and cannot be specified unconditionally. However, it is generally 10 mol % or less, and particularly preferably 5 mol % or less of the entire structural unit. When the amount of the copolymerizable monomer to be introduced is too large, the water solubility tends to be impaired, or the compatibility with a crosslinker tends to decrease.

In addition, those where the amount produced of a heterogeneous bond is increased relative to the 1,3-bond that is mainly produced, by setting the polymerization temperature to a high temperature at the time of polymerization or copolymerization of the vinyl ester monomer and other monomer and the proportion of 1,2-diol bond in the PVA main chain is adjusted to be approximately 1.6 mol % to 3.5 mol %, can be used.

[Crosslinked Product of Carboxyl Group-containing PVA-based Resin (A)]

In the present invention, in order to enhance the filling effect, it is preferable to use a crosslinked product obtained by crosslinking the carboxyl group-containing PVA-based resin (A).

As a method of forming the crosslinked product (crosslinking method), for example, heat treatment, crosslinker treatment, ultraviolet irradiation treatment, and electron beam irradiation treatment are used. Among these, preferred is a crosslinked product by heat treatment (A1) crosslinked by heat treatment or a crosslinked product with crosslinker (A2) crosslinked by a crosslinker. Hereinafter, the crosslinking method will be described.

First, a crosslinking method using a heat treatment will be described.

Examples of a method of the heat treatment include generally a method of subjecting the carboxyl group-containing PVA-based resin (A) to a specific heat treatment. As heat treatment conditions, a heat treatment temperature is generally 100° C. to 220° C., preferably 120° C. to 200° C., and more preferably 130° C. to 150° C. When the heat treatment temperature is too low, the water resistance tends to decrease, and when the heat treatment temperature is too high, the resin tends to decompose.

In addition, a heat treatment time is generally 10 minutes to 600 minutes, preferably 20 minutes to 400 minutes, and more preferably 100 minutes to 200 minutes. When the heat treatment time is too short, the water resistance tends to decrease, and when the heat treatment time is too long, the resin tends to decompose.

The heat treatment can also be performed by melt extrusion or the like.

In the present invention, the crosslinked product (A1) of the carboxyl group-containing PVA-based resin (A) by heat treatment is preferably obtained by heating the carboxyl group-containing PVA-based resin (A) at 100° C. to 220° C. for 10 minutes to 600 minutes.

An oxygen concentration in the above heat treatment is generally 3 vol % to 25 vol %, preferably 5 vol % to 23 vol %, and more preferably 10 vol % to 21 vol %. When the oxygen concentration is too low, the water resistance tends to decrease, and when the oxygen concentration is too high, the resin tends to decompose.

In addition, a nitrogen concentration in the above heat treatment is generally 75 vol % to 98 vol %, preferably 78 vol % to 95 vol %, and more preferably 80 vol % to 90 vol %. When the nitrogen concentration is too low, the resin tends to decompose, and when the nitrogen concentration is too high, the water resistance tends to decrease.

A yellow index (YI) value representing the yellowness of the crosslinked product by heat treatment (A1) obtained by such a heat treatment is generally 20 to 100, preferably 25 to 80, and more preferably 55 to 65. When the YI value is too small, the water resistance tends to decrease, and when the YI value is too large, the water absorption property of the resin tends to decrease.

The YI value can be determined by the method of JIS K 7373:2006, and the same applies to the following PVA-based resin (B) containing an active methylene group-containing modifying group.

Next, a crosslinking method using a crosslinker will be described.

As the crosslinker to be used in the crosslinker treatment, those known as a crosslinker for the carboxyl group-containing PVA-based resin can be used. Examples thereof include an aldehyde compound such as a monoaldehyde compound, e.g., formaldehyde and acetoaldehyde, and a polyvalent aldehyde compound, e.g., glyoxal, glutaraldehyde and dialdehyde starch; an amine-based compound such as methaxylenediamine, norbornanediamine, 1,3-bisaminomethylcyclohexane, bisaminopropylpiperazine, 3,3'-dimethyl-4,4'-diaminodicyclohexylmethane, 4,4'-diaminodicyclohexylmethane, 4,4'-diaminodiphenylmethane, 3,3',5,5'-tetramethyl-4,4'-diaminodiphenylmethane, 3,3',5,5'-tetraethyl-4,4'-diaminodiphenylmethane, 3,3'-dimethyl-4,4'-diamino-5,5'-diethyldiphenylmethane, 4,4'-diaminodiphenylether, diaminodiphenylsulfone, 1,2-phenylenediamine, 1,3-phenylenediamine, 1,4-phenylenediamine, 3-methyl-1,2-phenylenediamine, 4-methyl-1,2-phenylenediamine, 2-methyl-1,3-phenylenediamine, 4-methyl-1,3-phenylenediamine, 2-methyl-4,6-diethyl-1,3-phenylenediamine, 2,4-diethyl-6-methyl-1,3-phenylenediamine, 2,4,6-trimethyl-1,3-phenylenediamine and 2-chloro-1,4-phenylenediamine; a methylol compound such as methylolated urea and methylolated melamine; a reaction product of ammonia and formamide, such as hexamethylenetetramine; a boron compound such as boric acid and borax; a zirconia compound such as basic zirconyl chloride, zirconyl nitrate and ammonium zirconium acetate; titanium compound such as titanium orthoester, e.g., tetramethyl titanate, titanium chelate, e.g., titanium ethyl acetoacetonate, and titanium acylate, e.g., polyhydroxytitanium stearate; aluminum compound such as aluminum organic acid chelate, e.g., aluminum acetylacetonate; an organoalkoxysilane compound containing an organic reactive group, such as silane coupling agent; a polyvalent epoxy compound such as ethylene glycol diglycidyl ether, polyethylene glycol diglycidyl ether, glycerin diglycidyl ether, glycerin triglycidyl ether, hexanediol diglycidyl ether and trimethylolpropane triglycidyl ether; various isocyanate-based compounds; and a polyamidopolyamine-epihalohydrin-based resin such as polyamidopolyamine-epichlorohydrin-based resin. Among these, a polyamidopolyamine-epichlorohydrin-based resin is preferred.

The content of such a crosslinker is preferably 0.05 part by mass to 30 parts by mass, more preferably 0.5 part by mass to 20 parts by mass, and particularly preferably 1 part by mass to 10 parts by mass with respect to 100 parts by mass of the carboxyl group-containing PVA-based resin (A). When the content of the crosslinker is too small, the effect of the crosslinker tends to be poor, and when the content of the crosslinker is too large, the water absorption property of the resin tends to decrease.

As the method of mixing the carboxyl group-containing PVA-based resin (A) with the crosslinker, for example, (i) a method of mixing an aqueous solution of the carboxyl group-containing PVA-based resin (A) and an aqueous solution of the crosslinker, (ii) a method of spraying an aqueous solution of the crosslinker on the carboxyl group-containing PVA-based resin (A) in a solid state (e.g., powder), or (iii) a method of spraying an aqueous solution of the carboxyl group-containing PVA-based resin (A) on the crosslinker in a solid state, is used. Among these, the method of (ii) is preferred, because a solid-state crosslinked product is obtained with a short drying time.

The average particle diameter and the pulverization method of the crosslinked product (A1) of the carboxyl group-containing PVA-based resin (A) by heat treatment and the crosslinked product (A2) of the carboxyl group-containing PVA-based resin (A) with crosslinker are based on the carboxyl group-containing PVA-based resin (A).

[Polyvinyl Alcohol-Based Resin (B) Containing Active Methylene Group-Containing Modifying Group]

Next, the polyvinyl alcohol-based resin (B) containing an active methylene group-containing modifying group (hereinafter, sometimes abbreviated as an active methylene group-containing PVA-based resin (B)) used in the present invention will be described.

The active methylene group in the present invention indicates a methylene group having an increased acidity, such as a methylene group adjacent to a carbonyl group. That is, a crosslinking reaction occurs in a portion where the resonance is stabilized between the methylene group and the carbonyl group.

Such an active methylene group-containing PVA-based resin (B) is a PVA-based resin containing a modifying group and having a structure in which a carbonyl group and a methylene group are adjacent to each other, such as ketone, carboxylic acid or carboxylic acid ester, and specific examples thereof include a PVA-based resin containing an acetoacetyl group and a diacetone group.

Among these, an acetoacetyl group-containing PVA-based resin (hereinafter, abbreviated as AA-modified PVA-based resin) or a PVA-based resin having a diacetone acrylamide structural unit is preferred, and the AA-modified PVA-based resin is further preferred in view of the crosslinking property.

In the present invention, an average polymerization degree of the active methylene group-containing PVA-based resin (B) is preferably 300 to 4,000, more preferably 400 to 3,000, and still more preferably 800 to 2,000. When the average polymerization degree is too low, the water resistance tends to decrease, and when the average polymerization degree is too high, the viscosity increases, and handling and production tend to be difficult.

The above average polymerization degree is measured in accordance with JIS K 6726:1994.

A degree of saponification of the active methylene group-containing PVA-based resin (B) is preferably 75 mol % to 100 mol %, more preferably 80 mol % to 99.9 mol %, and still more preferably 85 mol % to 99.8 mol %. When the degree of saponification is too low, the water absorption property tends to decrease.

The above degree of saponification is measured in accordance with JIS K 6726:1994.

A content (modification rate) the active methylene group-containing PVA-based resin (B) is preferably 0.1 mol % to 10 mol %, more preferably 0.3 mol % to 8 mol %, and still more preferably 0.5 mol % to 6 mol % of the entire structural unit. When the content is too small, the water resistance tends to decrease, and when the content is too large, the water absorption property tends to decrease.

The viscosity of a 4 mass % aqueous solution of the active methylene group-containing PVA-based resin (B) is preferably 2 mPa·s to 80 mPa·s, more preferably 4 mPa·s to 70 mPa·s, and still more preferably 10 mPa·s to 60 mPa·s. When the viscosity is too low, the water resistance tends to decrease, and when the viscosity is too high, the viscosity increases, and handling and production tend to be difficult.

The viscosity of the 4 mass % aqueous solution of the active methylene group-containing PVA-based resin (B) is a viscosity at 20° C. measured in accordance with JIS K 6726:1994, by preparing a 4 mass % aqueous solution of the active methylene group-containing PVA-based resin (B).

The shape of the active methylene group-containing PVA-based resin (B) is not particularly limited, and is preferably powders. An average particle diameter of the powders is preferably 10 μm to 2,000 μm, more preferably 50 m to 1,000 μm, and still more preferably 100 μm to 500 μm. When the average particle diameter is too large, the dispersibility tends to decrease, and when the average particle diameter is too small, the water resistance tends to decrease.

The average particle diameter is measured as a volume median diameter using a laser diffraction apparatus.

Hereinafter, as a preferred embodiment of the active methylene group-containing PVA-based resin (B), an AA-modified PVA-based resin (b) will be described.

The AA-modified PVA-based resin (b) for use in the present invention is a resin in which an acetoacetyl group (AA group) is bonded directly or through an oxygen atom or a linking group to the main chain of a PVA-based resin and includes, for example, a PVA-based resin having a structural unit containing an AA group, represented by the following formula (1). The AA-modified PVA-based resin has a vinyl alcohol structural unit, other than the structural unit containing an AA group, and further has, if desired, a vinyl ester structural unit of an unsaponified portion.

[Chem. 1]

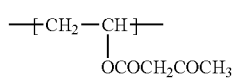

(1)

A content (degree of AA modification) of a structural unit containing an AA group is generally 0.1 mol % to 10 mol %, preferably 0.3 mol % to 8 mol %, and more preferably 0.5 mol % to 6 mol %, of the entire structural unit. When the degree of AA modification is too small, the water resistance tends to decrease, and when the degree of AA modification is too large, the water absorption property tends to decrease.

The degree of AA modification can be determined from the difference between the total amount of ester groups and the amount of the acetate group of the AA-modified PVA-based resin.

The preferred degree of saponification, average polymerization degree, viscosity of 4 mass % aqueous solution and shape of the AA-modified PVA-based resin (b) are as described above.

A method for producing the AA-modified PVA-based resin (b) is not particularly limited, and examples thereof can include (1) a method of reacting a PVA-based resin and diketene, (2) a method of reacting a PVA-based resin and an acetoacetic acid ester to effect transesterification, and (3) a method of saponifying a copolymer of vinyl acetate and vinyl acetoacetate. In particular, the resin is preferably produced by (1) the method of reacting a PVA-based resin and diketene, because the production process is simple and a high-quality AA-modified PVA is obtained.

Hereinafter, the method of (1) will be described.

As the PVA-based resin as a raw material, a saponified product of a polymer of a vinyl ester monomer, or a derivative thereof is generally used. Examples of the vinyl ester monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate, and in view of profitability, vinyl acetate is preferably used.

In addition, a saponified product of a copolymer of a vinyl ester monomer and a copolymerizable monomer with the vinyl ester-based monomer can be used. Examples of the copolymerizable monomer include: olefins such as ethylene, propylene, isobutylene, α-octene, α-dodecene, and α-octadecene; hydroxy group-containing α-olefins such as 3-buten-1-ol, 4-penten-1-ol, 5-hexen-1-ol, and 3,4-dihydroxy-1-butene, and derivatives such as an acylated product thereof, unsaturated acids such as an acrylic acid, a methacrylic acid, a crotonic acid, a maleic acid, a maleic anhydride, an itaconic acid, an undecylenic acid, and a salt, a monoester or a dialkyl ester thereof; nitriles such as acrylonitrile and methacrylonitrile; amides such as diacetone acrylamide, acrylamide and methacrylamide; olefin sulfonic acids such as an ethylene sulfonic acid, an allyl sulfonic acid, a methallyl sulfonic acid or a salt thereof; alkyl vinyl ethers; vinyl compounds such as dimethylallyl vinyl ketone, N-vinylpyrrolidone, vinyl chloride, vinylethylene carbonate, 2,2-dialkyl-4-vinyl-1,3-dioxolan, and glycerin monoallyl ether, substituted vinyl acetates such as isopropenyl acetate and 1-methoxyvinyl acetate; vinylidene chloride; 1,4-diacetoxy-2-butene; 1,4-dihydroxy-2-butene; and vinylene carbonate.

Further examples include: polyoxyalkylene group-containing monomers such as polyoxyethylene (meth)allyl ether, polyoxyethylene (meth)acrylamide, polyoxypropylene (meth)acrylamide, polyoxyethylene (meth)acrylate, polyoxypropylene (meth)acrylate, polyoxyethylene (1-(meth)acrylamide-1,1-dimethylpropyl) ester, polyoxyethylene vinyl ether, polyoxypropylene vinyl ether, polyoxyethylene allylamine, polyoxypropylene allylamine, polyoxyethylene vinylamine, and polyoxypropylene vinylamine; and cationic group-containing monomers such as N-acrylamidomethyltrimethylammonium chloride, N-acrylamidoethyltrimethylammonium chloride, N-acrylamidopropyltrimethylammonium chloride, 2-acryloxyethyltrimethylammonium chloride, 2-methacryloxyethyltrimethylammonium chloride, 2-hydroxy-3-methacryloyloxypropyltrimethylammonium chloride, allyltrimethylammonium chloride, methallyltrimethylammonium chloride, 3-butenetrimethylammonium chloride, dimethyldiallylammonium chloride, and diethyldiallylammonium chloride.

(Meth)acryl means acryl or methacryl, and (meth)acrylate means acrylate or methacrylate, respectively.

An amount of the copolymerizable monomer to be introduced varies depending on the type of the monomer, and cannot be specified unconditionally. However, it is generally 10 mol % or less, and particularly preferably 5 mol % or less of the entire structural unit. When the amount of the copolymerizable monomer to be introduced is too large, the water solubility tends to be impaired, or the compatibility with a crosslinker tends to decrease.

In addition, those where the amount produced of a heterogeneous bond is increased relative to the 1,3-bond that is mainly produced, by setting the polymerization temperature to a high temperature at the time of polymerization or copolymerization of the vinyl ester monomer and other monomer and the proportion of 1,2-diol bond in the PVA main chain is adjusted to be approximately 1.6 mol % to 3.5 mol %, can be used.

In order for a PVA-based resin obtained by saponifying a polymer or copolymer of the vinyl ester monomer above to react with diketene so as to introduce an acetoacetyl group, the PVA-based resin may be directly reacted with gaseous or liquid diketene, or a method of, for example, previously adsorbing and storing an organic acid to/in the PVA-based resin and then spraying and reacting gaseous or liquid diketene in an inert gas atmosphere, or spraying and reacting a mixture of an organic acid and liquid diketene on/with a PVA-based resin, is used.

A reaction apparatus for conducting the reaction above includes an apparatus capable of heating and equipped with a stirrer. For example, a kneader, a Henschel mixer, a ribbon blender, or other various blenders and stirring/drying apparatuses can be used.

The AA-modified PVA-based resin may be pulverized. As for the pulverization method, for example, roller milling, bead milling, ball milling, jet milling, hammer milling, pin milling, grinding pulverization, corrosion pulverization, freeze pulverization or other methods are used.

[Crosslinked Product of Active Methylene Group-Containing PVA-Based Resin (B)]

In the present invention, in order to enhance the filling effect, it is preferable to use a crosslinked product obtained by crosslinking the active methylene group-containing PVA-based resin (B).

As a method of forming the crosslinked product (crosslinking method), for example, heat treatment, crosslinker treatment, ultraviolet irradiation treatment, and electron beam irradiation treatment are used. Among these, preferred is a crosslinked product by heat treatment (B1) crosslinked by heat treatment or a crosslinked product with crosslinker (B2) crosslinked by a crosslinker. Hereinafter, the crosslinking method will be described.

First, a crosslinking method using a heat treatment will be described.

Examples of the crosslinking method using a heat treatment include generally a method of subjecting the active methylene group-containing PVA-based resin (B) to a specific heat treatment. As heat treatment conditions, a heat treatment temperature is generally 100° C. to 220° C., preferably 120° C. to 200° C., and more preferably 130° C. to 150° C. When the heat treatment temperature is too low, the water resistance tends to decrease, and when the heat treatment temperature is too high, the resin tends to decompose.

In addition, a heat treatment time is generally 10 minutes to 600 minutes, preferably 20 minutes to 400 minutes, and more preferably 100 minutes to 200 minutes. When the heat treatment time is too short, the water resistance tends to decrease, and when the heat treatment time is too long, the resin tends to decompose.

The heat treatment can also be performed by melt extrusion or the like.

An oxygen concentration in the above heat treatment is generally 3 vol % to 25 vol %, preferably 5 vol % to 23 vol %, and more preferably 10 vol % to 21 vol %. When the oxygen concentration is too low, the water resistance tends to decrease, and when the oxygen concentration is too high, the PVA-based resin tends to decompose.

In addition, a nitrogen concentration in the above heat treatment is generally 75 vol % to 98 vol %, preferably 78 vol % to 95 vol %, and more preferably 80 vol % to 90 vol %. When the nitrogen concentration is too low, the PVA-based resin tends to decompose, and when the nitrogen concentration is too high, the water resistance tends to decrease.

A YI value representing the yellowness of the crosslinked product (B1) obtained by the above heat treatment is generally 20 to 100, preferably 25 to 80, and more preferably 30 to 40. When the YI value is too small, the water resistance tends to decrease, and when the YI value is too large, the water absorption property of the resin tends to decrease.

Next, a crosslinking method using a crosslinker will be described.

As the crosslinker to be used in the crosslinker treatment, those known as a crosslinker for the active methylene group-containing PVA-based resin can be used. Examples thereof include: inorganic crosslinkers such as chromium compounds, aluminum compounds, zirconium compounds, and boron compounds; and organic crosslinkers such as glyoxal, glyoxylic acid and a salt thereof, urea resins, polyamine polyamide epichlorohydrin, polyethyleneimine, carbodiimide-based compounds, oxazoline-based compounds, aziridine-based compounds, hydrazine-based compounds, isocyanate-based compounds, melamine-based compounds, epoxy-based compounds, aldehyde-based compounds, N-methylol-based compounds, acryloyl-based compounds, active halogen compounds, and ethyleneimino-based compounds, or metal salts and metal complex salts of the above. In particular, in view of water resistance, a glyoxylic acid and a metal salt thereof are preferred, a metal salt of glyoxylic acid is more preferred, and sodium glyoxylate is still more preferred.

The content of such a crosslinker is preferably 0.05 part by mass to 30 parts by mass, more preferably 0.5 part by mass to 20 parts by mass, and particularly preferably 1 part by mass to 10 parts by mass with respect to 100 parts by mass of the active methylene group-containing PVA-based resin (B). When the content of the crosslinker is too small, the effect of the crosslinker tends to be poor, and when the content of the crosslinker is too large, the water absorption property of the resin tends to decrease.

As the method of mixing the active methylene group-containing PVA-based resin (B) with the crosslinker, for example, (i) a method of mixing an aqueous solution of the active methylene group-containing PVA-based resin (B) and an aqueous solution of the crosslinker, (ii) a method of spraying an aqueous solution of the crosslinker on the active methylene group-containing PVA-based resin (B) in a solid state (e.g., powder), or (iii) a method of spraying an aqueous solution of the active methylene group-containing PVA-based resin (B) on the crosslinker in a solid state, is used. Among these, the method of (ii) is preferred, because a solid-state crosslinked product is obtained with a short drying time.

The average particle diameter and the pulverization method of the crosslinked product (B1) of the active methylene group-containing PVA-based resin (B) by heat treatment and the crosslinked product (B2) of the active methylene group-containing PVA-based resin (B) with crosslinker are the same as those of the active methylene group-containing PVA-based resin (B).

In the present invention, the modified PVA-based resin and the unmodified PVA may be used alone or two or more types having different viscosities, average polymerization degrees, degrees of saponification, and modification amounts may be used in combination. When two or more types are used in combination, the average value of the viscosities, the average polymerization degrees, the degrees of saponification, and the modification amounts are preferably within the above-mentioned ranges.

The filling material for underground treatment of the present invention may contain, if necessary, reinforcing agents, fillers, plasticizers, pigments, dyes, lubricants, antioxidants, antistatic agents, ultraviolet absorbers, heat stabilizers, light stabilizers, surfactants, antibacterial agents, antistatic agents, desiccants, anti-blocking agents, flame retardants, curing agents, foaming agents, crystal nucleating agents, or the like in a range where the effects of the present invention are not impaired.

When the filling material for underground treatment of the present invention is used as a lost circulation material, it is generally added to running water (muddy water or the like) on site and used in the form of a mixture. That is, the filling material for underground treatment of the present invention is contained in a liquid to be flown into a well formed underground, and is used for underground treatment. In this form, a mixing ratio of the lost circulation material is preferably 0.01 mass % to 50 mass %, and more preferably 0.1 mass % to 30 mass %, from the viewpoint of the filling workability of the mixture.

Further, the present invention also provides a method for preventing lost circulation using the above filling material for underground treatment. When the filling material for underground treatment of the present invention is contained in muddy water near the ground where lost circulation is likely to occur, the PVA-based resin of the present invention contained in the filling material for underground treatment swells, so that a gap formed in the wall surface of the well such as drilling holes and trenches can be effectively closed (filled), and lost circulation can be prevented.

The filling material for underground treatment of the present invention can be used without limitation at sites where muddy water drilling technology such as well drilling and reverse construction is used, and the method of use may be in accordance with ordinary methods.

EXAMPLES

Hereinafter, the present invention will be described more specifically with reference to Examples and Comparative Examples, but the present invention is not limited to these Examples. In the following Examples and Comparative Examples, "parts" and "%" are based on mass unless otherwise specified.

The average particle diameter, the average polymerization degree, the degree of saponification, the swelling ratio (height swelling ratio), the water separation ratio, and the filling workability of the polyvinyl alcohol (PVA)-based resin and the crosslinked product thereof were measured by the following methods.

(a) Average Particle Diameter (μm)

The volume distribution was measured by dry dispersion using a laser diffraction particle size distribution analyzer "Mastersizer 3000" manufactured by Malvern, and the diameter at which the integrated value became 50% was calculated.

(b) Average Polymerization Degree

The average polymerization degree was measured in accordance with JIS K 6726:1994.

(c) Degree of Saponification (%)

In accordance with JIS K 6726:1994, the degree of saponification was determined by analyzing the amount of alkali consumed for hydrolysis of residual acetic ester groups of the PVA-based resin as a raw material.

(d) Height Swelling Ratio

1. A PVA-based resin in an amount of 0.5 g was weighed and placed in a 10 mL test tube having an inner diameter of 13.5 mm, and the height of the PVA-based resin in the test tube at this time was measured as an initial height.

2. Into the test tube, 7 mL of water was charged, followed by stirring, and the PVA-based resin was dispersed in the water.

3. The test tube was immersed in a water bath whose temperature had been controlled to 80° C., and was left for 30 minutes after the water temperature in the test tube reaches 80° C.

4. The height of the PVA-based resin in the test tube after 30 minutes was measured as the height after swelling.

5. The swelling ratio (height swelling ratio) of the PVA-based resin was calculated according to the following equation.

Swelling ratio (%)=(height after swelling/initial height)×100

(e) Evaluation on Filling Effect (Water Separation Ratio)

Into a sample cell of an S-250 muddy water filtration tester (manufactured by Nishinihonshikenki company), 400 parts of purified water was charged, and 3 parts of a PVA-based resin was added under stirring at 500 rpm. After continuing the stirring for 30 minutes, the stirring was stopped and the mixture was allowed to stand for 5 minutes. The inside of the cell was pressurized to 0.05 MPa using air, and a dehydrated liquid was collected. The measurement was performed for 5 minutes, and the water separation ratio was determined according to the following equation.

Water separation ratio (%)=recovered liquid (g)/(purified water (g)+resin (g))×100

(f) Filling Workability

In the above "(e) Evaluation on filling effect (water separation ratio)", the state of the liquid at the time of stirring the liquid was visually observed and evaluated according to the following criteria.

[Evaluation Criteria]

A (good): The PVA-based resin was uniformly dispersed in the liquid.

B (poor): The PVA-based resin absorbed too much water, making uniform stirring difficult.

Example 1: Crosslinked Product (PVA1) of Maleic Acid-Modified PVA-Based Resin by Heat Treatment Into a reaction can equipped with a reflux condenser, a dropping funnel and a stirrer, 100 parts of vinyl acetate, 26 parts of methanol, and 0.1 part of monomethyl maleate were charged. After raising the temperature to 60° C. under a nitrogen flow while stirring the contents, 0.001 mol % (relative to the total amount of the vinyl acetate) of tert-butyl peroxyneodecanoate (the temperature providing a half life of 1 hour is 65° C.) was charged as a polymerization catalyst, and the polymerization was initiated. Immediately after the initiation of polymerization, 2.2 parts (2 mol % relative to the total amount of the vinyl acetate) of monomethyl maleate and 0.008 mol % (relative to the total amount of the vinyl acetate) of tert-butyl peroxyneodecanoate were continuously further added in pace with the polymerization rate, and when the polymerization rate of the vinyl acetate reached 73%, 0.01 part of 4-methoxyphenol and 58 parts of methanol for dilution/cooling were added to complete the polymerization. The amount of the residual active catalyst at the time of the completion of polymerization was 2 ppm relative to the total amount of the reaction solution.

Subsequently, the unreacted vinyl acetate monomer was removed to the outside of the system by a method of blowing a methanol vapor to obtain a methanol solution of a copolymer.

Then, the solution obtained was then diluted with methanol and thereby adjusted to a concentration of 40% and after a 4% methanol solution of sodium hydroxide was mixed in such a ratio as giving 30 mmol relative to 1 mol of the vinyl acetate structural unit in the copolymer, a saponification reaction was performed at a temperature of 40° C. to 50° C. for 25 minutes. The resin solidified by the saponification reaction was cut to obtain a maleic acid-modified PVA-based resin. The modification rate of the obtained maleic acid-modified PVA-based resin was 2.1 mol %.

The obtained maleic acid-modified PVA-based resin was vacuum-dried for 5 hours in a heat treatment can at a jacket temperature of 130° C. to 135° C., and then subjected to a heat treatment at 130° C. to 135° C. for 3 hours while flowing nitrogen gas at a rate of 24 Nm$^3$/h under normal pressure to the heat treatment can, to obtain a crosslinked product (PVA1) of the maleic acid-modified PVA-based resin by heat treatment. The average particle diameter of the PVA1 was 379 μm.

Example 2: Crosslinked Product (PVA2) of Maleic Acid-Modified PVA-Based Resin by Heat Treatment Into a sample cell for freeze pulverization, 7 parts of the crosslinked product (PVA1) of the maleic acid-modified PVA-based resin by heat treatment obtained in Example 1 was charged, and freeze pulverization was performed under liquid nitrogen at 10 cps for 100 seconds by using Freezer/Mill (SPEX SamplePrep), to obtain a crosslinked product (PVA2) of the maleic acid-modified PVA-based resin by heat treatment. The average particle diameter of the PVA2 was 204 μm.

Example 3: Crosslinked Product (PVA3) of Maleic Acid-Modified PVA-Based Resin by Heat Treatment Into a reaction can equipped with a reflux condenser, a dropping funnel and a stirrer, 100 parts of vinyl acetate, 30 parts of methanol, and 0.28 part of monomethyl maleate were charged. After raising the temperature to 60° C. under a nitrogen flow while stirring the contents, 0.0014 mol % (relative to the total amount of the vinyl acetate) of tert-butyl peroxyneodecanoate (the temperature providing a half life of 1 hour is 65° C.) was charged as a polymerization catalyst, and the polymerization was initiated. Immediately after the initiation of polymerization, 5.4 parts (4 mol % relative to the total amount of the vinyl acetate) of monomethyl maleate and 0.013 mol % (relative to the total amount of the vinyl acetate) of tert-butyl peroxyneodecanoate were continuously further added in pace with the polymerization rate, and when the polymerization rate of the vinyl acetate reached 80%, 0.01 part of 4-methoxyphenol and 60 parts of methanol for dilution/cooling were added to complete the polymerization. The amount of the residual active catalyst at the time of the completion of polymerization was 2 ppm relative to the total amount of the reaction solution.

Subsequently, the unreacted vinyl acetate monomer was removed to the outside of the system by a method of blowing a methanol vapor to obtain a methanol solution of a copolymer.

Then, the solution obtained was then diluted with methanol and thereby adjusted to a concentration of 43% and after a 4% methanol solution of sodium hydroxide was mixed in such a ratio as giving 60 mmol relative to 1 mol of the vinyl acetate structural unit in the copolymer, a saponification reaction was performed at a temperature of 40° C. to 50° C. for 25 minutes. The resin solidified by the saponification reaction was cut to obtain a maleic acid-modified PVA-based resin. The modification rate of the obtained maleic acid-modified PVA-based resin was 4.0 mol %.

The obtained maleic acid-modified PVA-based resin was sieved, and 200 parts of the maleic acid-modified PVA-based resin was spread on an aluminum foil and subjected to a heat treatment in a dryer at 140° C. for 4 hours. During the heat treatment, the resin was mixed using a spatula four times every hour, to obtain a crosslinked product (PVA3) of the maleic acid-modified PVA-based resin by heat treatment. The average particle diameter of the PVA3 was 358 μm.

Example 4: Crosslinked Product (PVA4) of Maleic Acid-modified PVA-based Resin with Crosslinker Into a reaction can equipped with a reflux condenser, a dropping funnel and a stirrer, 100 parts of vinyl acetate, 26 parts of methanol, and 0.1 part of monomethyl maleate were charged. After raising the temperature to 60° C. under a nitrogen flow while stirring the contents, 0.001 mol % (relative to the total amount of the vinyl acetate) of tert-butyl peroxyneodecanoate (the temperature providing a half life of 1 hour is 65° C.) was charged as a polymerization catalyst, and the polymerization was initiated. Immediately after the initiation of polymerization, 2.2 parts (2 mol % relative to the total amount of the vinyl acetate) of monomethyl maleate and 0.008 mol % (relative to the total amount of the vinyl acetate) of tert-butyl peroxyneodecanoate were continuously further added in pace with the polymerization rate, and when the polymerization rate of the vinyl acetate reached 73%, 0.01 part of 4-methoxyphenol and 58 parts of methanol for dilution/cooling were added to complete the polymerization. The amount of the residual active catalyst at the time of the completion of polymerization was 2 ppm relative to the total amount of the reaction solution.

Subsequently, the unreacted vinyl acetate monomer was removed to the outside of the system by a method of blowing a methanol vapor to obtain a methanol solution of a copolymer.

Then, the solution obtained was then diluted with methanol and thereby adjusted to a concentration of 40% and after a 4% methanol solution of sodium hydroxide was mixed in such a ratio as giving 30 mmol relative to 1 mol of the vinyl acetate structural unit in the copolymer, a saponification reaction was performed at a temperature of 40° C. to 50° C. for 25 minutes. The resin solidified by the saponification reaction was cut to obtain a maleic acid-modified PVA-based resin. The modification rate of the obtained maleic acid-modified PVA-based resin was 2.1 mol %.

Into a plastic bag, 50 parts of the obtained maleic acid-modified PVA-based resin was charged, and 50 parts of a 12.5% aqueous solution of polyamide-epichlorohydrin (wet strengthening agent WS4002, Seiko PMC Corporation) as a crosslinker was sprayed thereon by means of a spray. Subsequently, the contents were shaken up for 10 minutes while grasping the mouth of the plastic bag with a hand to obtain a mixture.

The mixture was spread on an aluminum tray and dried by leaving it to stand at 70° C. for 3 hours in a dryer, and 7 parts of the dried product was charged into a sample cell for freeze pulverization and freeze-dried at 10 cps for 100 seconds under liquid nitrogen by using Freezer/Mill (SPEX SamplePrep), to obtain a crosslinked product (PVA4) of the maleic acid-modified PVA-based resin with crosslinker. The average particle diameter of the PVA4 was 213 μm.

Comparative Example 1: Maleic Acid-Modified PVA-Based Resin (PVA5)

A maleic acid-modified PVA-based resin (PVA5) having an average particle diameter of 358 μm was obtained by sieving using the maleic acid-modified PVA-based resin before the heat treatment prepared in Example 1.

Comparative Example 2: Acetoacetyl (AA)-Modified PVA-Based Resin (PVA6)

Into a kneader, 100 parts of a PVA (degree of saponification: 98.0 mol %, viscosity of 4% aqueous solution: 54 mPa·s, average polymerization degree: 2400) was charged, 30 parts of acetic acid was charged thereto, the mixture was swollen, the temperature was raised to 60° C. while stirring at a rotation speed of 20 rpm, and then 5 parts of diketene was added dropwise over 5 hours to further react the mixture for 1 hour.

After completion of the reaction, the resultant was washed with methanol and dried at 70° C. for 12 hours to obtain an AA-modified PVA-based resin (PVA6). The degree of AA modification of the PVA6 was 4.0 mol %, and the average particle diameter thereof was 306 μm.

Example 5: Crosslinked Product (PVA7) of AA-Modified PVA-Based Resin with Crosslinker Into a plastic bag, 50 parts of the PVA6 obtained in Comparative Example 2 was charged, and 25 parts of a 10% aqueous solution of sodium glyoxylate as a crosslinker was sprayed thereon by means of a spray. Subsequently, the contents were shaken up for 10 minutes while grasping the mouth of the plastic bag with a hand to obtain a mixture.

The mixture was spread on an aluminum tray and dried by leaving it to stand at 70° C. for 3 hours in a dryer, and 7 parts of the dried product was charged into a sample cell for freeze pulverization and freeze-dried at 10 cps for 100 seconds under liquid nitrogen by using Freezer/Mill (SPEX SamplePrep), to obtain a crosslinked product (PVA7) of the AA-modified PVA-based resin with crosslinker. The average particle diameter of the PVA7 was 377 μm.

Example 6: Unmodified PVA (PVA8)

A PVA (degree of saponification: 99.7 mol %, polymerization degree: 2600) was crushed by collision using a BI mill (manufactured by Micro Powtech Co., Ltd.) until a target size was reached, to obtain an unmodified PVA (PVA8) having an average particle diameter of 62 μm.

Example 7: Unmodified PVA (PVA9)

On an aluminum foil, 200 parts of the unmodified PVA (PVA8) obtained in Example 6 was spread and subjected to a heat treatment in a dryer at 125° C. for 5 hours. During the heat treatment, the resin was mixed using a spatula four times every hour, to obtain an unmodified PVA (PVA9). The average particle diameter of the PVA9 was 61 sm.

Example 8: Crosslinked Product (PVA10) of AA-modified PVA-based Resin with Crosslinker Into a plastic bag, 50 parts of the AA-modified PVA-based resin (PVA6) obtained in Comparative Example 2 was charged, and 25 parts of a 10% aqueous solution of sodium glyoxylate as a crosslinker was sprayed thereon by means of a spray. Subsequently, the contents were shaken up for 10 minutes while grasping the mouth of the plastic bag with a hand to obtain a mixture.

The mixture was spread on an aluminum tray and dried in a dryer at 140° C. for 6 hours to obtain a crosslinked product (PVA10) of the AA-modified PVA-based resin with crosslinker.

Comparative Example 3: Highly Water-absorbent Resin

A highly water-absorbent polymer ("highly water-absorbent polymer (acrylate-based)" (trade name)) purchased from Wako Pure Chemical Corporation was used as the highly water-absorbent resin of Comparative Example 3.

The average polymerization degree, the degree of saponification, the height swelling ratio, the water separation ratio, and the filling workability of the PVA-based resins and the highly water-absorbent resin prepared in Examples 1 to 8 and Comparative Examples 1 to 3 were measured. Results are shown in Table 1.

As seen from the results in Table 1, in Examples 1 to 8, the swelling ratio (height swelling ratio) after immersion in water at a temperature of 80° C. for 30 minutes is in the range of 250% to 900%, which can effectively close the gaps, and the filling workability is also excellent. In addition, in Examples 1 to 8, the water separation ratio is 40% or less, and water leakage from the muddy water filtration tester is prevented as compared with Comparative Examples 1 to 3. Among these, in Examples 1 to 3, the water absorption property is high, the height swelling ratio is 700% or more, and the water separation ratio is 20% or less.

Although the present invention has been described in detail with reference to specific embodiments, it will be apparent to those skilled in the art that various changes and modifications can be made without departing from the spirit and scope of the present invention. The present application is based on a Japanese Patent Application (No. 2017-254845) filed on Dec. 28, 2017, contents of which are incorporated herein by reference.

The invention claimed is:

1. An underground treatment method comprising:
incorporating a filling material for underground treatment into a liquid to be flown into a well that is formed underground, the filling material for underground treatment comprising:
at least one polyvinyl alcohol-based resin of a modified polyvinyl alcohol-based resin and an unmodified polyvinyl alcohol, wherein
a swelling ratio of the polyvinyl alcohol-based resin after immersion in water at a temperature of 80° C. for 30 minutes is 250% to 900%;
provided that the filling material is not added to a cementing fluid or used in a cementing step.

2. The underground treatment method according to claim 1, wherein the modified polyvinyl alcohol-based resin is a polyvinyl alcohol-based resin (A) containing a carboxyl group.

3. The underground treatment method according to claim 1, wherein the modified polyvinyl alcohol-based resin is a

TABLE 1

| | PVA No. | Average polymerization degree | Degree of saponification (%) | Modification rate (mol %) | Modification type | Treatment method | Height swelling ratio (%) | Water separation ratio (%) | Filling workability |
| --- | --- | --- | --- | --- | --- | --- | --- | --- | --- |
| Example 1 | PVA1 | 1800 | 96.5 | 2.1 | Maleic acid | Heat treatment | 760 | 15 | A |
| Example 2 | PVA2 | 1800 | 96.5 | 2.1 | Maleic acid | Heat treatment, pulverization | 800 | 2 | A |
| Example 3 | PVA3 | 1800 | 96 | 4.0 | Maleic acid | Heat treatment | 750 | 19 | A |
| Example 4 | PVA4 | 1800 | 96.5 | 2.1 | Maleic acid | Crosslinker, pulverization | 293 | 37 | A |
| Example 5 | PVA7 | 2400 | 98 | 4 | Acetoacetyl group | Crosslinker, pulverization | 371 | 38 | A |
| Example 6 | PVA8 | 2600 | 99.7 | — | unmodified | Pulverization | 410 | 29 | A |
| Example 7 | PVA9 | 2600 | 99.7 | — | unmodified | Pulverization, heat treatment | 380 | 38 | A |
| Example 8 | PVA10 | 2400 | 98 | 4 | Acetoacetyl group | Crosslinker, heat treatment | 583 | 36 | A |
| Comparative Example 1 | PVA5 | 1800 | 96.5 | 2.1 | Maleic acid | — | 167 | 44 | A |
| Comparative Example 2 | PVA6 | 2400 | 98 | 4 | Acetoacetyl group | — | 218 | 41 | A |
| Comparative Example 3 | Highly water-absorbent resin | — | — | — | — | — | 920 | 25 | B | crosslinked product (A1) of a polyvinyl alcohol-based resin (A) containing a carboxyl group by heat treatment.

4. The underground treatment method according to claim 1, wherein the modified polyvinyl alcohol-based resin is a crosslinked product (A2) of a polyvinyl alcohol-based resin (A) containing a carboxyl group with crosslinker.

5. A method for filling a well wall, comprising: incorporating a filling material for underground treatment into muddy water near the ground where lost circulation occurs, the filling material for underground treatment comprising:
   at least one polyvinyl alcohol-based resin of a modified polyvinyl alcohol-based resin and an unmodified polyvinyl alcohol, wherein
   a swelling ratio of the polyvinyl alcohol-based resin after immersion in water at a temperature of 80° C. for 30 minutes is 250% to 900%;
   provided that the filling material is not added to a cementing fluid or used in a cementing step.

6. The method for filling a well wall according to claim 5, wherein the modified polyvinyl alcohol-based resin is a polyvinyl alcohol-based resin (A) containing a carboxyl group.

7. The method for filling a well wall according to claim 5, wherein the modified polyvinyl alcohol-based resin is a crosslinked product (A1) of a polyvinyl alcohol-based resin (A) containing a carboxyl group by heat treatment.

8. The method for filling a well wall according to claim 5, wherein the modified polyvinyl alcohol-based resin is a crosslinked product (A2) of a polyvinyl alcohol-based resin (A) containing a carboxyl group with crosslinker.

* * * * *